Figure 1:
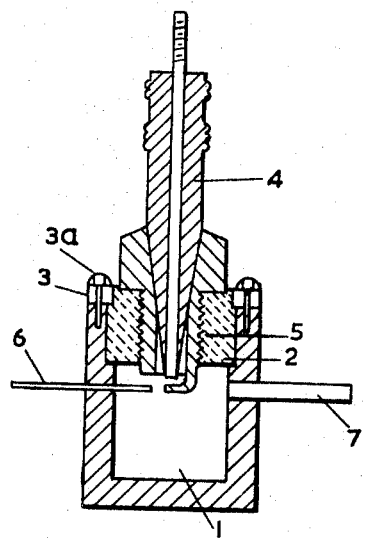

United States Patent
Narain

[15] 3,656,339
[45] Apr. 18, 1972

[54] GLOW DISCHARGE DETECTOR

[72] Inventor: Chandramani Narain, Croydon, England
[73] Assignee: The British Oxygen Company Limited, London, England
[22] Filed: Jan. 21, 1970
[21] Appl. No.: 4,580

[30] Foreign Application Priority Data
  Jan. 22, 1969  Great Britain..................03,599/69

[52] U.S. Cl..........................73/23.1, 313/231, 315/111
[51] Int. Cl..................................G01n 31/08, H01j 17/26
[58] Field of Search............73/23.1, 25, 26, 27; 313/231, 313/147; 315/DIG. 5, 7, 111

[56] References Cited

UNITED STATES PATENTS 1,630,454  5/1927  Thomas.................................313/147
3,238,415  3/1966  Turner..................................315/100

OTHER PUBLICATIONS

Basson " A Glow Discharge Detector for G. C." Journal of the South African Industrial Chem. Oct. 1959, pgs. 62–68.
Fisher " Highly Sensitive Electric Discharge Detector For Chem. Analyser" Anal. Chem. Vol. 32 pgs. 1208–1210, Sept. 1965.

Primary Examiner—Richard C. Queisser
Assistant Examiner—Ellis J. Koch
Attorney—Townshend & Meserole

[57] ABSTRACT

The invention relates to an electrical glow discharge detector for detecting small amounts of gaseous impurity in a gas, having a pair of electrodes in a fluid-tight chamber provided with a constant bore capillary tube inlet. The sensitivity of the detector is improved by applying across the electrodes a power source capable of both supplying a low, sensitive, discharge voltage and a high discharge starting voltage to restart the discharge if the sensitive voltage should permit it to fail.

11 Claims, 5 Drawing Figures

GLOW DISCHARGE DETECTOR

1. Field of the Invention

The invention relates to detectors capable of detecting small amounts of gaseous impurities in gas.

2. Description of the Prior Art

It has been proposed to detect the presence of impurity gases in a gas by means of their effect on an electrical glow discharge set up between two electrodes. Such electrical glow discharge detectors have provided a relatively simple means of detecting small amounts of impurity gases and have produced signals requiring little or no amplification. In such detectors it is however necessary to effect the discharge in a chamber through which the carrier gas flows under low pressure and this has been achieved, for example in gas chromatography, by passing the gas stream into the chamber through a drawn glass capillary. In such drawn glass capillaries, the bore tapers toward the outlet end and the practice has been to draw the capillary to a very fine taper so that the resistance to flow is greater than is necessary to establish the required conditions in the chamber and the resistance to flow is then progressively reduced by breaking off small lengths of the capillary until the desired flow and pressure conditions are established in the chamber. Such a method, however, requires individual adjustment of each detector and is therefore unsuitable for mass production techniques.

Previous electrical glow discharge detectors have proved difficult, if not impossible, to operate at voltages below a certain threshold value.

SUMMARY OF THE INVENTION

According to the present invention there is provided apparatus for detecting small amounts of a gaseous impurity in a gas, comprising a substantially fluid-tight chamber having disposed therein a pair of electrodes, a substantially constant-bore capillary inlet tube for feeding the gas to the chamber, and an exhaust port connectable to a suction pump, the electrodes being connected to a power source providing a first electrode voltage sufficient to start an electrical glow discharge between the electrodes and a second, direct, electrode voltage of less than the threshold value for the gas to be introduced into the chamber, the power source being provided with a control whereby the voltage across the electrodes is reduced to the second voltage when an electrical discharge exists between the electrodes.

The invention also provides a method for detecting small amounts of a gaseous impurity in a gas, including the steps of passing the gas through a constant bore capillary inlet tube into a substantially fluid-tight low-pressure chamber having disposed therein a pair of electrodes connected to a power source providing a first electrode voltage sufficient to start an electrical glow discharge between the electrodes and a second, direct, electrode voltage of less than the threshold value for the gas in the chamber, the power source being provided with a control whereby the voltage across the electrode is reduced to the second voltage when an electrical discharge exists between the electrodes.

The term "threshold value" as used herein refers to the voltage level below which discharge failure would tend to occur. The threshold value varies according to the components of the gaseous mixture. In the case of carbon dioxide in air, for example, it is 280 volts. The reason for this threshold difficulty has probably been the presence of relatively large amounts of gases such as oxygen which tend to cause failure of the discharge. The presence of oxygen may arise from atmospheric leaks or from the carrier gas itself.

Gaseous impurities which may need to be detected in commercial operations include, for example, carbon dioxide in air, carbon monoxide in air and paraffin gases such as methane in inert gases such as argon or in air or nitrogen.

The chamber can be constructed from any suitable material, either metal or plastics. Brass has been found to be particularly suitable. The fluid-tight characteristics of the chamber, that is to say its resistance to leakage, can be improved, if necessary, by keeping the number of joints to a minimum, and, if any joints are employed, by employing some form of sealing material between the joined portions, or by providing a lining. Preferably, the chamber is of one piece construction. In general it is found that the smaller the chamber the better is the sensitivity of the apparatus and a small chamber is therefore preferred, a convenient size being within the range 10 to 20 mls.

The electrodes may conveniently be provided by a single spark plug. A particularly convenient construction is however provided by using two modified spark plugs from which the outer electrodes have been removed and aligning the two spark plugs end-to-end with the two central electrodes opposing each other.

Thus the invention also provides apparatus for detecting small amounts of a gaseous impurity in a gas, comprising a substantially fluid-tight chamber having disposed therein a pair of electrodes, a substantially constant-bore capillary inlet tube for feeding the gas to the chamber, and an exhaust port connectable to a suction pump, the electrodes being provided by the central electrodes, aligned end-to-end, of two spark plugs from which the outer electrodes have been removed and being connectable to a power source providing a first electrode voltage sufficient to start an electrical glow discharge between the electrodes and a second, direct, electrode voltage of less than the threshold value for the gas to be introduced into the chamber.

In combination with some form of fluid-tight seal between the spark plug threads and the chamber threads in which they are received, such a double spark plug construction is advantageous in allowing easy adjustment of the gap between the electrodes. Suitable seals are, for example, O rings or thread fillers of polytetrafluorethylene.

Preferably the gap between the electrodes is within the range 0.25 to 1 mm. If required, the electrodes can be insulated from the chamber by a non-tracking plastics material such a polytetrafluorethylene or an epoxy resin. Such plastics materials can also be used to provide seals or lining for the chamber.

In operation the pressure in the chamber is preferably within the range 4 to 9 mm of mercury. The capillary tube must therefore be of a length and diameter which gives the appropriate pressure drop from the pressure of the gas supply the the desired chamber pressure. With a constant bore capillary the length required to give the appropriate pressure drop is readily determined. The internal diameter of the capillary inlet tube is preferably within the range 0.20 to 0.30 mm, most conveniently about 0.25 mm since this is a generally available size. For most applications the length of capillary inlet tubing having this preferred bore is within the range 0.3 to 0.5 m. Provided that other parameters are held constant the chosen tubing will always produce substantially the same conditions inside the chamber and it is not therefore, necessary to employ the trial and error form of adjustment required with tapered glass capillaries.

The exhaust port should be of an internal diameter sufficiently large to allow the suction pump easily to maintain the low pressure in the chamber. A suitable size is within the range 2.0 to 5.0 mm.

The control for the power source can be, for example, any form of electrical circuit which reduces the first voltage to a level not exceeding that of the second voltage when an electrical discharge exists between the electrodes. If the discharge fails the first voltage will thus retain its initial level, that is to say to a level sufficient to restart the discharge.

Thus, in practice, the second voltage is the operating voltage.

The preferred voltages depend upon the gas in the chamber. In the case of carbon dioxide in air the second voltage is preferably within the range 215 to 240 volts and the starting level for the first voltage is preferably within the range 300 to 400 volts. Although the second voltage must be a direct voltage, the first voltage can if desired be alternating.

The control can conveniently be provided by including a high resistance in series with the first electrode voltage supply, the resistance being sufficient to reduce the first voltage to a level not exceeding that of the second voltage when a discharge is established between the electrodes.

It has been found that the sensitivity of electrical discharge detectors is considerably improved if the voltage across the electrodes is as low as possible.

The present invention also provides a gas chromatograph provided with electrical glow discharge apparatus as hereinbefore described.

Figure 3:
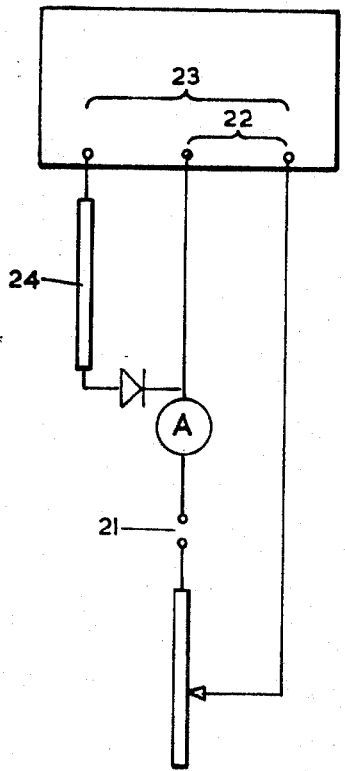
Figure 5:
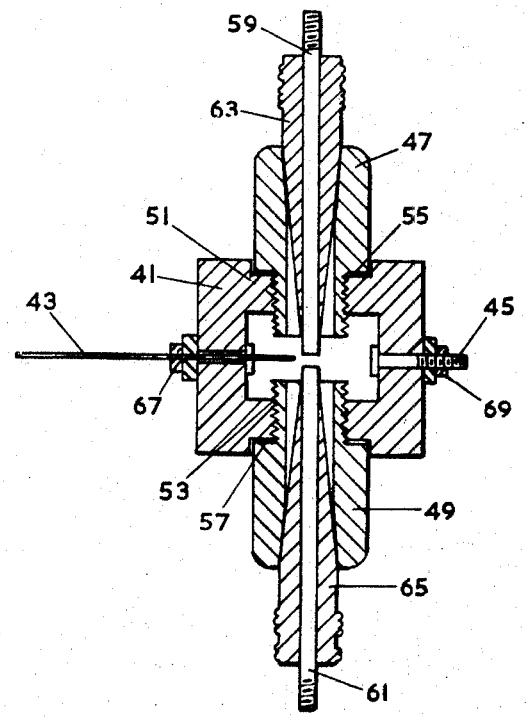
Figure 2:
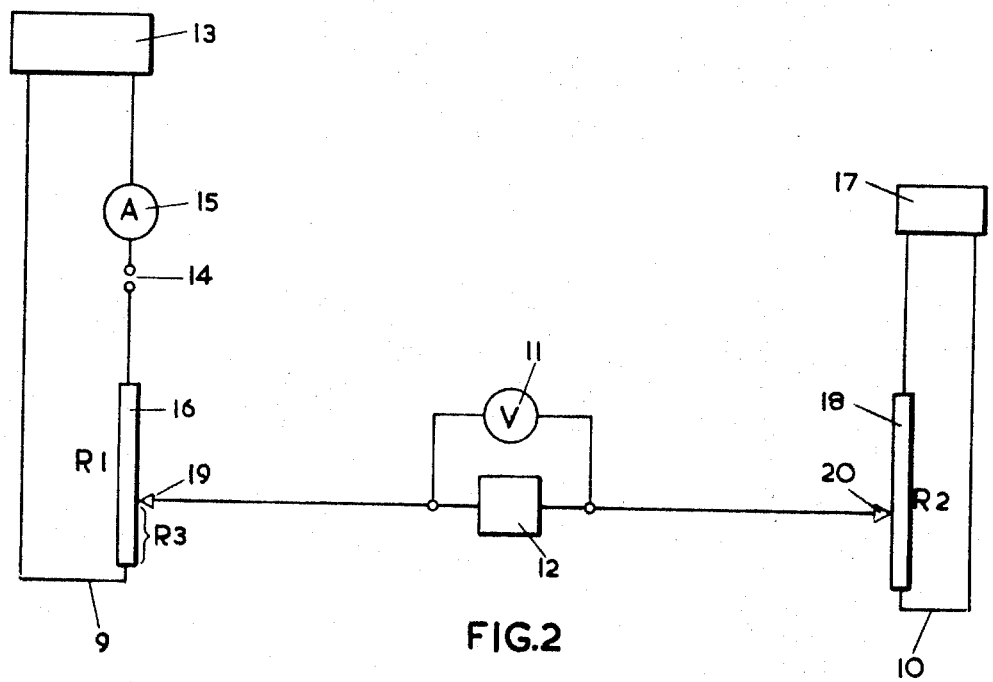
Figure 4:
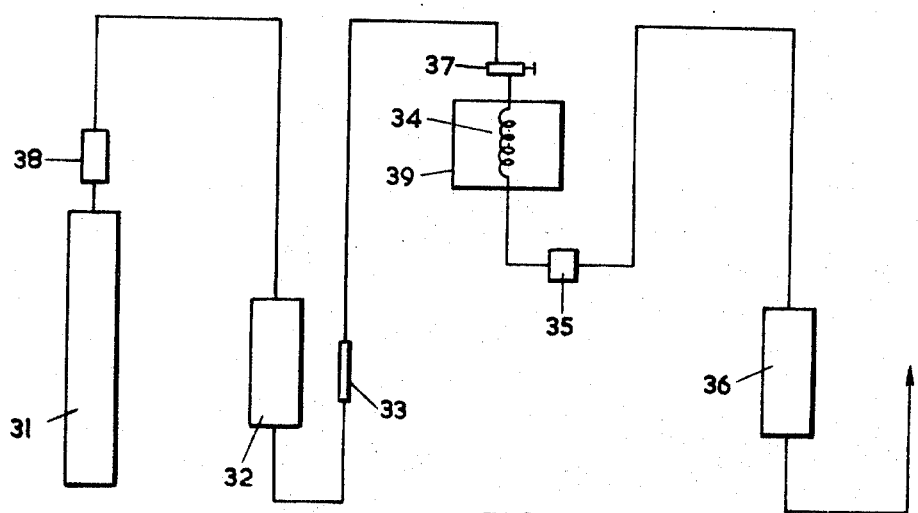

The present invention will now be described by way of example with reference to the accompanying drawings in which:

FIG. 1 is a diagrammatic sectional elevation of one form of electrical glow discharge chamber suitable for use in apparatus according to the invention, FIG. 2 is an electrical circuit diagram showing an electrical glow discharge signal circuit, but not including a discharge starting control, FIG. 3 is an electrical circuit diagram according to the invention showing an electrical glow discharge restarting circuit and signal recording system, FIG. 4 is a diagrammatic representation of a gas chromatograph including an electrical glow discharge apparatus, and FIG. 5 is a diagrammatic sectional elevation of a second form of electrical glow discharge chamber suitable for use in apparatus according to the invention.

The electrical glow discharge apparatus shown in FIG. 1 comprises a brass chamber 1, having a polytetrafluoroethylene insert 2 secured in position by a compression ring 3 and screws 3a. A spark plug 4 is tightly screwed into a tapped hole 5 in the insert 2. An inlet tube 6 formed from a length of stainless steel tube of 0.25 mm internal diameter is welded into a hole in the chamber 1. An outlet tube 7, formed from a length of tube of 4.75 mm external diameter and 3.0 mm internal diameter is welded into a hole in the opposite wall of the chamber 1. The outlet of the tube 6 is directed towards the electrodes of the sparking plug 4. The volume of the chamber is approximately 16 ml. The simple construction of the apparatus ensures that atmospheric leaks are almost completely eliminated.

In operation, gas at a relatively high pressure enters the inlet tube 6 where due to the flow restriction the pressure is reduced to that required inside the chamber 1. The pressure inside the chamber 1 is maintained by a suction pump (not shown) connected to the outlet tube 7. A starting voltage is applied between the electrodes but as soon as the discharge starts the voltage is reduced by a control to a reduced level.

In the electrical circuit diagram shown in FIG. 2 a power supply 13 is connected across the spark plug 14 which is located in a fluid-tight manner. A milliameter 15 and a rheostat 16 are connected in series with the spark plug 14. A balance circuit 10 comprises a 5.6 V power supply 17 and a rheostat 18. A recorder 12 and a voltmeter 11 are connected in parallel across the two rheostat pickups 19 and 20. A discharge current flowing in circuit 9 produces a voltage across the resistor R3 which is received by the rheostat pickup 19. The voltage produced across R3 when the discharge occurs in pure carrier gas is balanced against a voltage produced across the variable resistor R2 in circuit 10 by adjusting the position of rheostat pickup 20. The balance point may be found by using the voltmeter 11. In an impurity gas enters the chamber 2 the glow discharge current will alter thereby upsetting this voltage balance. The excess voltages produced between the pickups 19 and 20 may be displayed on the recorder 12. The changes in discharge current are, however, often sufficiently large to be observed on the milliameter 15.

As is discussed previously, the electrical discharge will tend to fail if the power source gives a voltage below a threshold value and for such voltages it is necessary to include a discharge restarting control in the circuit.

FIG. 3 shows a circuit able to supply automatically a starting voltage to the electrodes if the discharge should fail. A stabilized direct current voltage supply 22 providing the operating voltage is connected across a spark plug 21 in parallel with an unstabilized alternating supply 23 providing the starting voltage. A 2 megohm resistor 24 is connected between the unstabilized supply and the spark plug 21. With no discharge current flowing the resistor 24 has no effect and the voltage across the spark plug 21 is that provided by the supply 23. This is sufficient to start and restart the discharge. As soon as the discharge starts, or restarts, however the voltage across the spark plug is the stabilized supply 22, the voltage from the supply 23 having been reduced to a very small value due to the ohmic drop across the resistor 24.

The use of such an automatic discharge restarting circuit allows operation of the apparatus at much lower voltages than previously and it has been found that at the low voltages the sensitivity of such detectors is considerably improved. For example at an operating voltage for the detector described above of 230 volts, it has been possible to detect as little as 0.05 ppm of carbon dioxide in nitrogen carrier gas.

A gas chromatograph suitable for use with the present invention is shown in FIG. 4. Nitrogen, to act as a carrier gas, passes from cylinder 31 through a regulator 38 which reduces the pressure to about 1.05 kg/sq cm., and then in turn passes through a surge-vessel 32, a flow meter 33 and a packed column 34, 1.5 m long, packed with silica-gel and located in an oven 39. The nitrogen then passes through an electrical discharge detector 35, through a second surge vessel 36 and is finally drawn off by a vacuum pump.

When it is required to carry out a gas analysis, a small sample (about 5 ml) of the gas mixture to be analyzed is injected into the chromatograph by a sampling valve 37, and is entrained in the nitrogen carrier stream passing through the column 34. The different constituents in the gas sample are retarded to different extents, so that they leave the column 34 in distinct bands, one after the other. The purpose of the electrical glow discharge detector 35 is to detect these bands of gas as they appear, and to give a quantitative measure of the amount of each gas. After passing through the electrical glow discharge detector 35 the gas passes to a second surge-vessel 36, and is then exhausted by the vacuum pump.

The form of apparatus shown in FIG. 5 comprises a brass chamber 41, a capillary tube inlet 43 and an outlet tube 45. Two modified spark plugs 47 and 49 are held in threaded holes 51 and 53 in the chamber, and react on polytetrafluorethylene O-rings 55 and 57. Both spark plugs 47 and 49 have no outer electrode, the electrodes for the electrical discharge being provided by the central electrodes 59 and 61. The apparatus thus relies on the insulation members 63 and 65 of the spark plugs themselves to insulate the electrodes 59 and 61 and does not require the use of additional insulating means. The inlet and outlet tubes 43 and 45 are secured in position in fluid tight manner by welding to screw nuts 67 and 69.

In operation the electrodes 59 and 61 are connected to a suitable circuit and gas is passed into the chamber 41 through capillary tube 43. Outlet 45 is connected to a suitable vacuum pump.

I claim:

1. Apparatus for detecting small amounts of a gaseous impurity in a gas, comprising a substantially fluid-tight chamber having disposed therein a pair of electrodes, a substantially constant-bore capillary inlet tube for feeding gas to the chamber, an exhaust port connectable to a suction pump, a power source connected to the electrodes comprising a first voltage source sufficient to start an electric glow discharge in the gas to be introduced into the chamber and a second, direct, voltage source between the level below which discharge failure would tend to occur and the minimum level at which a discharge can be created in said gas, said voltage sources connected in parallel cross said electrodes and a resistor connected in series with said first voltage source having a resistance sufficient to reduce the voltage from said first voltage source to a small value such that the effective voltage across said electrodes is substantially that of said second source.

2. Apparatus as claimed in claim 1, wherein the chamber is of one-piece construction.

3. Apparatus as claimed in claim 1, wherein the chamber is formed of two or more joined portions and a sealing material is employed between the joined portions.

4. Apparatus as claimed in claim 1, wherein the chamber is formed of two or more joined portions and is provided with a lining.

5. Apparatus as claimed in claim 1, wherein the electrodes are provided by a single spark plug.

6. Apparatus as claimed in claim 1, wherein the gap between the electrodes is within the range 0.25 to 1.0 mm.

7. Apparatus as claimed in claim 1, wherein the internal diameter of the capillary inlet tube is within the range 0.20 to 0.30 mm.

8. Apparatus as claimed in claim 7 wherein the length of capillary inlet tubing is within the range 0.3 to 0.5 m.

9. Apparatus as claimed in claim 1, wherein the exhaust port has an internal diameter within the range 2.0 to 5.0 mm.

10. Apparatus for detecting small amounts of a gaseous impurity in a gas, comprising a substantially fluid-tight chamber having disposed therein a pair of electrodes provided by the central electrodes, aligned end-to-end, of two spark plugs from which the outer electrodes have been removed, a substantially constant-bore capillary inlet tube for feeding gas to the chamber, an exhaust port connectable to a suction pump, a power source connected to the electrodes comprising a first voltage source sufficient to start an electric glow discharge in the gas to be introduced into the chamber and a second, direct, voltage source between the level below which discharge failure would tend to occur and a minimum level at which a discharge can be created in said gas, said voltage sources connected in parallel across said electrodes and a resistor connected in series with said first voltage source having a resistance sufficient to reduce the voltage from said first voltage source to a small value such that the effective voltage across said electrodes is substantially that of said second source.

11. Apparatus as claimed in claim 10, wherein a fluid-tight seal is provided between the spark plug threads and the chamber threads in which they are received.

* * * * *